(No Model.)

A. WRIGHT.
SAND BAND FOR WHEEL HUBS.

No. 388,237. Patented Aug. 21, 1888.

WITNESSES.

INVENTOR,
Aaron Wright.
By James J. Sheehy,
Attorney.

United States Patent Office.

AARON WRIGHT, OF HUDSON, NEW YORK, ASSIGNOR OF THREE-FOURTHS TO GILBERT WRIGHT, LOUIS W. GROAT, AND EDWIN GROAT, ALL OF SAME PLACE.

SAND-BAND FOR WHEEL-HUBS.

SPECIFICATION forming part of Letters Patent No. 388,237, dated August 21, 1888.

Application filed May 1, 1888. Serial No. 272,523. (No model.)

*To all whom it may concern:*

Be it known that I, AARON WRIGHT, a citizen of the United States, residing at Hudson, in the county of Columbia and State of New York, have invented certain new and useful Improvements in Oil-Cups for Wheel-Hubs; and I do declare the following to be a full, clear, and exact description of the invention, such as will enable others skilled in the art to which it appertains to make and use the same.

This invention has relation to improvements in attachments for vehicle-wheels, and has for its object to provide a cheap and simple means for receiving and retaining lubricants while being fed to the axle spindle, and which device will serve the additional function of a sandband. These objects I accomplish in the mechanism shown in the accompanying drawings, in which—

Figure 1:
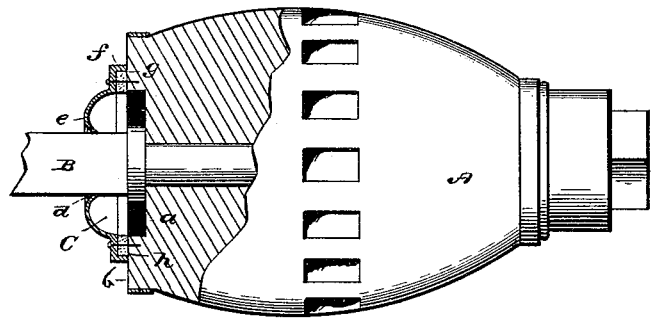
Figure 2:
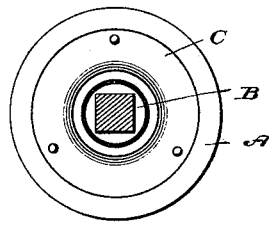

Figure 1 is a view of an ordinary wheelhub, partly in section, with a spindle in position and my improvements applied; and Fig. 2 is a sectional view taken on the lines $x\ x$ of Fig. 1.

Referring by letter to the said drawings, A indicates a wheel-hub, which may be of any ordinary or approved construction, and B an axle with its spindle therein. The hub is provided at its inner end and around the eye with a chamber or recess, $a$, leaving a projected plain marginal portion, $b$.

C indicates an oil-cup, which is of a peculiar form, being approximately hemispherical, with an annular aperture, $d$, for the passage of the spindle, and the edges around this aperture are turned inwardly, as shown at $e$, so as to prevent the lubricant placed therein from flying during the rotation of the wheel. The inner edge of this cup is provided with a rectangular flange, $f$, which forms a recess, $g$, to receive a packing-ring, $h$, as shown. The cup is also provided adjacent to the flanged margin with a suitable number of perforations for the reception of screws or other fastening devices, which latter also pass through the packing in the recess of the cup.

It will be observed from the construction illustrated that the inner end of the wheel has a plain solid margin, so as to furnish a bearing for the edges of the cup, and that the cup being flanged and recessed by the use of the packing a very firm connection may be had, and one which will prevent the leaking of the oil.

It should also be observed that the aperture or eye of the cup has its edges turned sufficiently inward and in such close relation to the axle or spindle as to prevent any oil or lubricant from being thrown out during the rotation of the wheel, and this cup also serves as an excellent means of excluding sand, dust, and the like.

Having described my invention, what I claim is—

A wheel-hub having its inner end annularly recessed around the eye therein, the said recess being surrounded by the marginal plain surface of the hub, in combination with the metallic oil-cup, which is adapted to serve the additional function of a sand-band, having its inner edge flanged, as shown, to receive a packing and be secured to the said plain portion of the hub, and its outer edge curved inwardly and in close relation to the axle or spindle, substantially as and for the purposes specified.

In testimony whereof I affix my signature in presence of two witnesses.

AARON WRIGHT.

Witnesses:
 HORACE R. PECK,
 AARON W. CHAPIN.